J. Cowell,
Machine Gearing.
No. 79,957.     Patented July 14, 1868.

Witnesses
J. H. Shumaey
A. J. Tibbits

Inventor
John Cowell
By his Attorney
John E. Earle

United States Patent Office.

JOHN COWELL, OF ANSONIA, CONNECTICUT.

*Letters Patent No. 79,957, dated July 14, 1868.*

IMPROVEMENT IN TOOTHED WHEELS.

*The Schedule referred to in these Letters Patent and making part of the same.*

TO ALL WHOM IT MAY CONCERN:

Be it known that I, JOHN COWELL, of Ansonia, in the county of New Haven, and State of Connecticut, have invented a new Improvement in the Construction of Toothed Wheels; and I do hereby declare the following, when taken in connection with the accompanying drawings, and the letters of reference marked thereon, to be a full, clear, and exact description of the same, and which said drawings constitute part of this specification, and represent, in—

Figure 1:
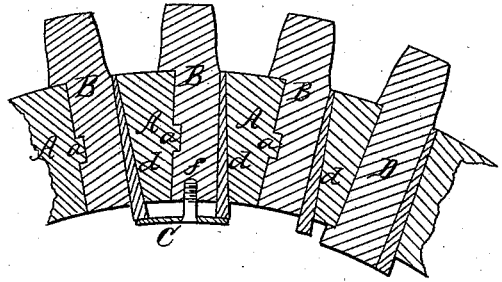

Figure 1, a section of the rim of a wheel with the teeth attached.

Figure 2:
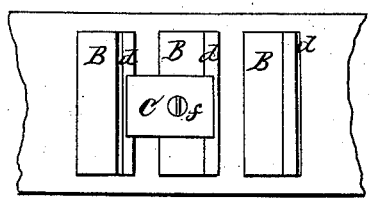

Figure 2, a top view of the same, and in

Figure 3:
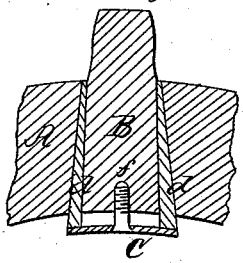

Figure 3 a sectional view of a modification of the same.

This invention relates to an improvement in the manner of securing teeth in gear-wheels, that is to say, teeth constructed so as to be inserted after the wheel is cast; and the invention consists in the arrangement of a key, combined with the construction of the tooth and mortise, so that the said key, driven into the mortise beside the tooth, firmly secures the tooth in the mortise.

To enable others to construct my improvement, I will proceed to describe the same as illustrated in the accompanying drawings.

A is the rim of the wheel, formed with mortises through and in proper relative position for the insertion of a tooth into each mortise. Upon one surface or side of the mortise a flange, $a$, is formed, projecting into the mortise. The teeth B are formed so as to set into the said mortise, and with a recess cut in their face corresponding to the flange $a$, so that when placed in the mortise the recess in the tooth will set over the flange, as seen in fig. 1; then upon the opposite side, between the tooth and that face of the mortise, a key, $d$, is driven which holds the tooth firmly upon the flange, and prevents its accidental removal or loosening; but if it is desired at any time to remove the tooth, drive out the key $d$, and the tooth may be removed or replaced at pleasure.

I prefer to make a lock in the plate by means of the flange $a$, yet the tooth may be locked, as seen at D, fig. 1, the recess in the tooth being equal to the thickness of the rim of the wheel, or face of the mortise, and locked thereon in the same manner. This lock, however, is not so strong as the first described.

In order to prevent the accidental throwing out of the keys, I arrange a plate, C, bearing upon every two of the keys with a screw, $f$, through the said plate into the tooth, as denoted in figs. 1 and 2, whereby the wedges are held firmly up to their bearing.

In fig. 3 is shown a modification as a substitute for the flange $a$. The mortise is made broader upon the under side of the rim of the wheel than upon the top, both sides corresponding. The tooth B is also made slightly broader at that end, and so that a key, $d$, may be driven upon both sides to adjust and secure the tooth, the said two keys held in position by the plate C and screw $f$, before described.

Having thus fully described my invention, what I claim as new and useful, and desire to secure by Letters Patent, is—

1. The combination of a detachable tooth with the corresponding mortises in the rim of the wheel, when constructed with a recess in one face of the tooth, so as to lock on to the corresponding face of the mortise, and secured by the key $d$, substantially as set forth.

2. The combination of the plate C and its set-screw $f$ with the key or keys $d$, so as to secure the keys, substantially in the manner herein set forth.

JOHN COWELL.

Witnesses:
HENRY K. HOTCHKISS,
JOHN H. HALL.